UNITED STATES PATENT OFFICE.

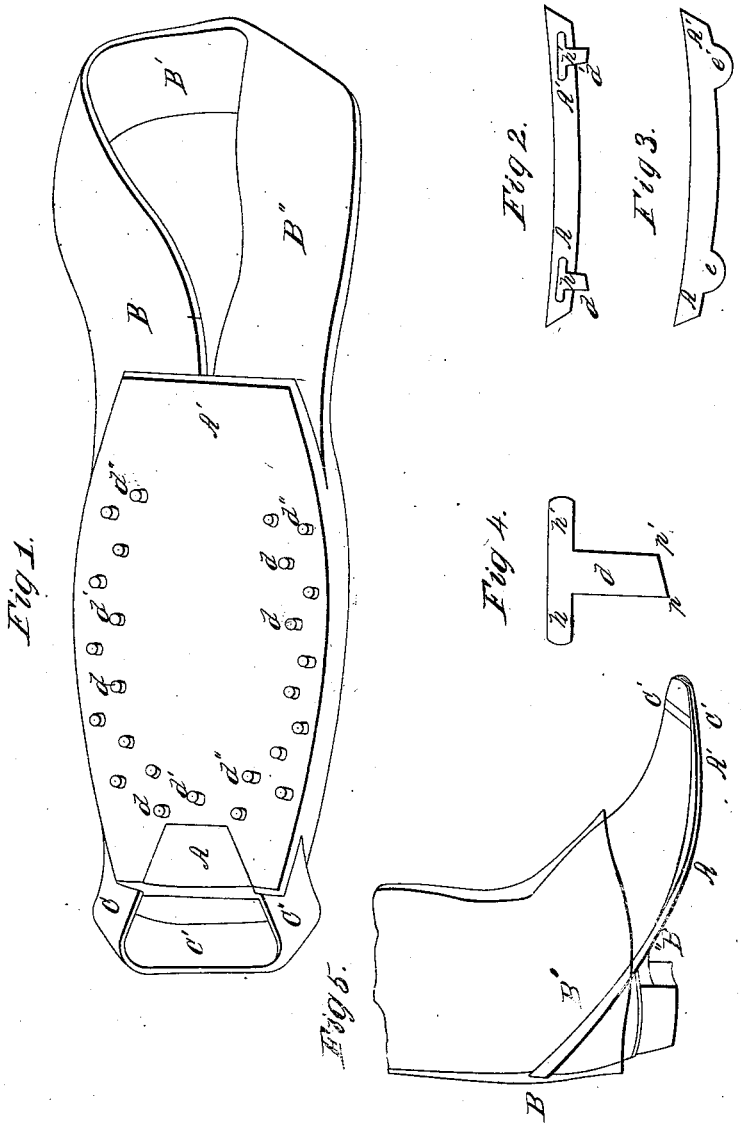

CHARLES W. STEARNS, OF SPRINGFIELD, MASSACHUSETTS.

IMPROVEMENT IN CLOGS OR PATTENS.

Specification forming part of Letters Patent No. 8,053, dated April 22, 1851.

*To all whom it may concern:*

Be it known that I, CHARLES W. STEARNS, of Springfield, in the county of Hampden and State of Massachusetts, have invented a new and useful Article Designed to be Worn on the Foot to Remedy the Inconveniences of Slippery Walking, and also of Damp Walking; and I declare the following to be a full, clear, and exact description of the method of constructing and using the same, reference being had to the accompanying drawing, making a part of this specification—

Figure I being a perspective view, Figs. II, III, and IV being sectional drawings of parts, and Fig. V a general view of the article as it appears on the foot.

Thus the part A A', Fig. I, represents a sole-piece similar in shape to the sole of a shoe.

B B' B'' is an elastic strap made to go around the heel, and C C' C'' an inelastic strap to go over the toe, and d' d' d'' are nails or pins with their heads set or fixed in the sole-piece in such a manner that their points may project through on the under side.

The elastic strap B B' B'' forms a large loop by having its two ends attached to the sole-piece near the hollow of the foot, and thence rising obliquely to go around the heel, as seen in the general view, Fig. V, at B B' B''. It thus operates to keep the foothold on the foot by constantly drawing against the inelastic strap C C' C'', which goes over the toe. The two ends of the toe-strap are attached obliquely to the sole-piece, so as to adapt it better to the natural shape of the foot, and also to counteract any tendency of the sole-piece to work sidewise out of place in the act of walking. The nails or pins are made with broad flat heads, or otherwise conveniently shaped, as shown at h h', Fig. IV, so as to admit of their being securely held between the layers of india-rubber, leather, or other flexible substance of which the sole-piece is formed, and having their end projecting through the under layers. I propose to set the nails near the edge of the sole-piece, so that as the middle is without nails the pressure of the foot will in effect cause the upper surface of the sole-piece to adapt itself more closely to the usual convex surface of the shoe-sole, and thus by causing it to hug or pack more closely around the edges will thereby more effectually exclude the moisture from getting in between the two, and also cause the nails to take a better hold on the ground than they would if distributed equally over the whole surface of the sole-piece. I also contemplate making an article designed more particularly for damp walking, having the same relative arrangement of the sole-piece and straps, but without the nails, and having instead of the nails rows of prominent well-defined projections, or a continuous ridge e e', Fig. III, of the substance of the sole-piece, or for the same purpose of making the sole-piece thicker at the edges than in the middle, either of the above methods being designed to exclude the moisture more effectually by causing the sole-piece to hug or pack more closely around the edges than it would if the greatest pressure came more in the middle of the foot.

What I claim, therefore, as my invention, and desire to secure by Letters Patent, is—

The application of an elastic loop or strap attached to the sole-piece and going around the heel, substantially as in the manner above described.

CHARLES W. STEARNS.

Witnesses:
   JOS. W. NEWMONT,
   EDWIN CHAPIN.